Figure 1:
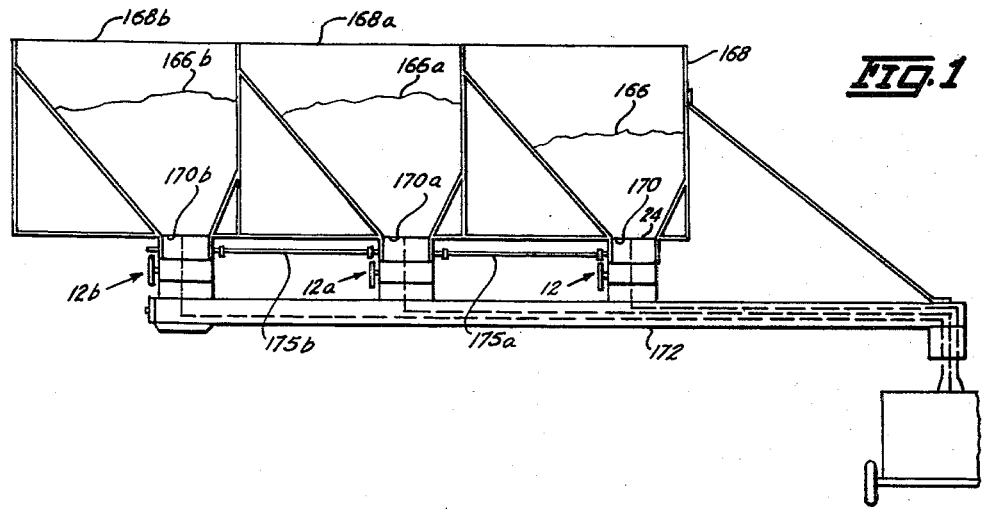

May 18, 1965  T. H. GRAU  3,184,108

APPARATUS FOR MIXING FEEDS

Filed Nov. 13, 1962  5 Sheets-Sheet 1

INVENTOR.
THEODORE H. GRAU

BY *[signature]*
ATTORNEY.

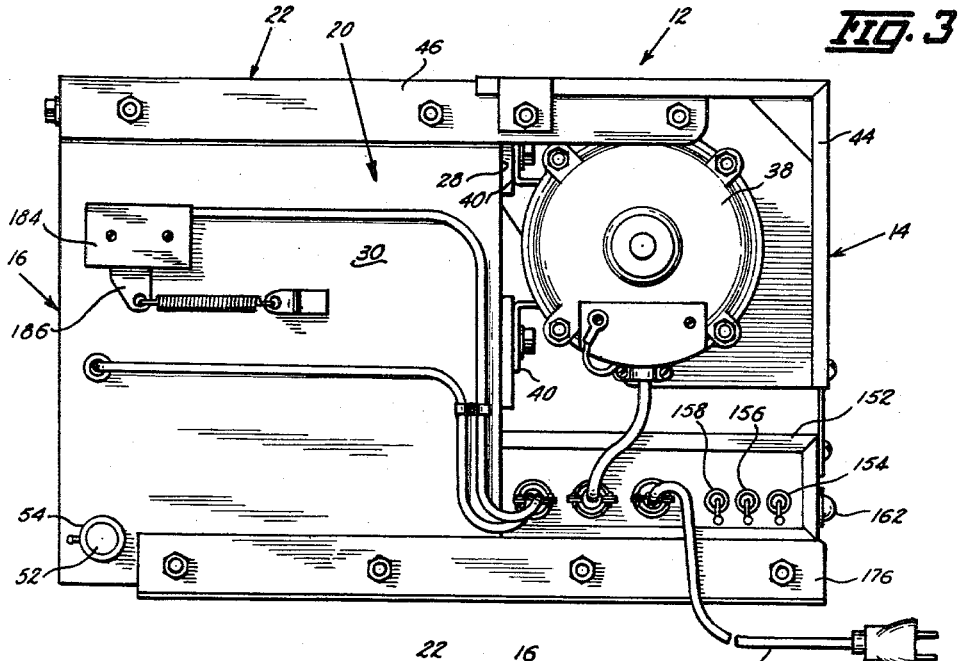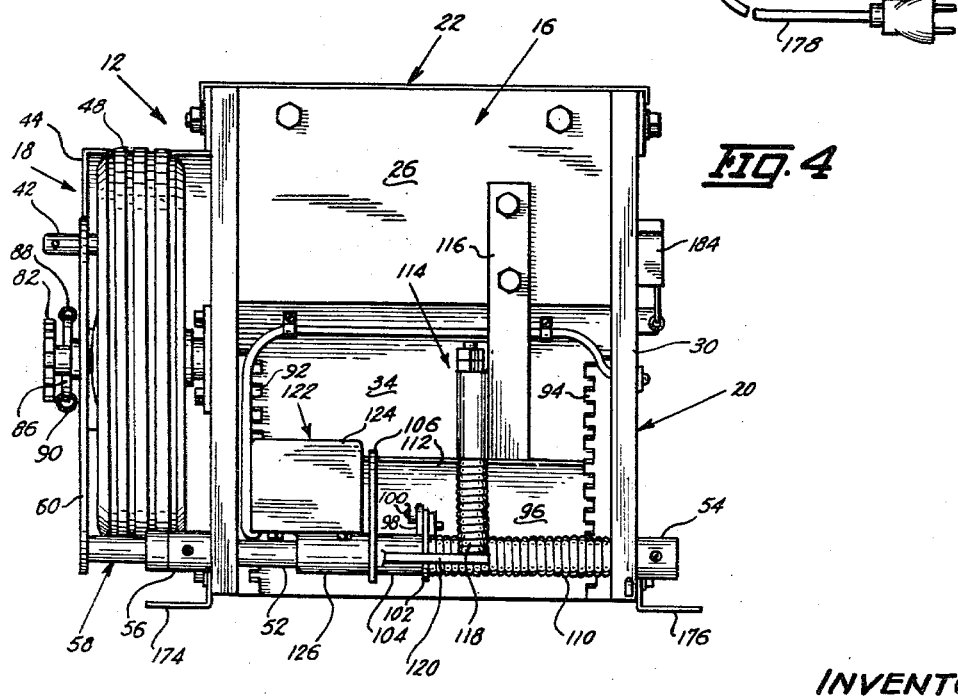

May 18, 1965

T. H. GRAU 3,184,108

APPARATUS FOR MIXING FEEDS

Filed Nov. 13, 1962

5 Sheets-Sheet 3

INVENTOR.
THEODORE H. GRAU
BY
ATTORNEY

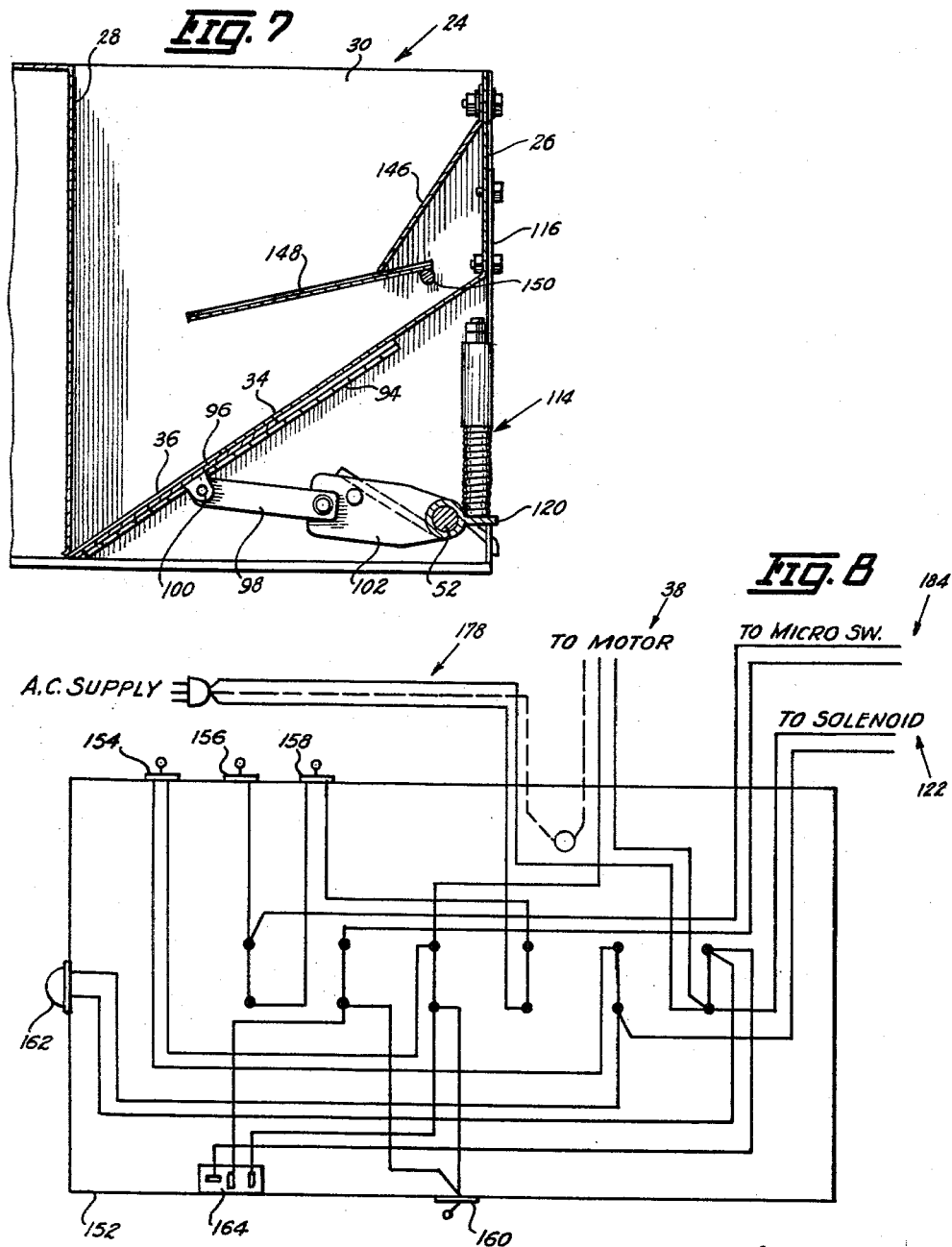

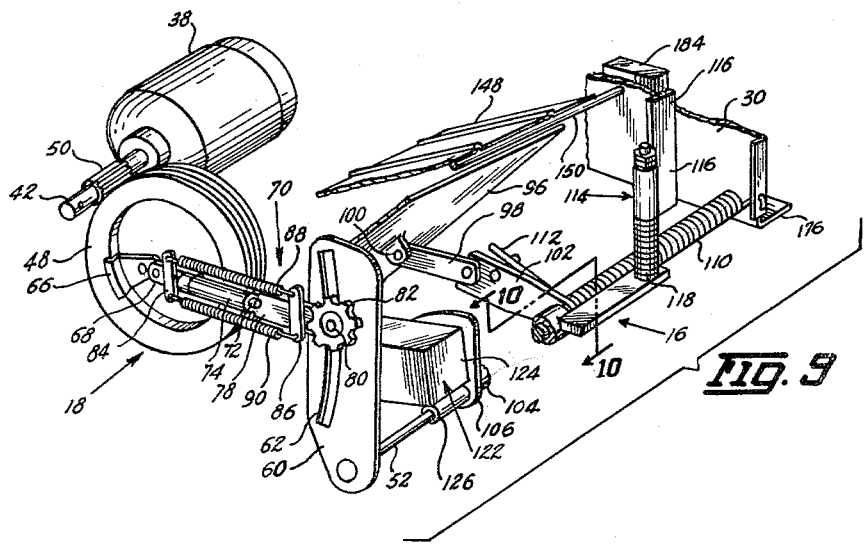
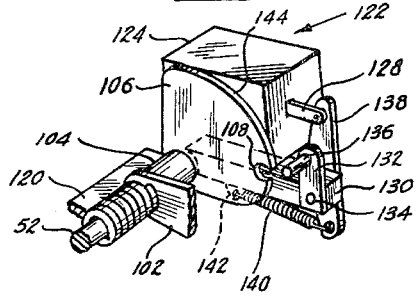

United States Patent Office 3,184,108
Patented May 18, 1965

3,184,108
APPARATUS FOR MIXING FEEDS
Theodore H. Grau, Rembrandt, Iowa
Filed Nov. 13, 1962, Ser. No. 237,259
16 Claims. (Cl. 222—58)

This invention relates to improved apparatus and to an improved method for handling and mixing free flowing materials and has particular utility in the mixing of feeds and feed supplements in precise proportions according to predetermined requirements.

The importance and necessity of properly balanced nutrients in any type of livestock or poultry feed is now well recognized if top profit percentages are to be obtained from the marketing of such animals. The addition of minerals, proteins and vitamins to grain and roughage is widespread since adequate supplies of such elements are generally not present in soil that has suffered from depletion in the production of crops over many years, and such elements must be included in feed to obtain the most efficient and profitable conversion of livestock and poultry into commercial meat.

As a partial solution to the problem of processing properly mixed and supplemented animal feeds, certain feed storage and feed handling establishments provide a feed mixing, blending and delivery service to the farmer but this is sometimes quite costly and involves not only additional handling and processing but ofttimes unavoidable and expensive delays. Machines for mixing and blending feed on the farm for private ownership require relatively large capital outlays without compensating efficiency and accuracy in the results obtainable.

Having been directly concerned for many years with the feeding of livestock and poultry and having observed the problems as pointed out above, I have invented a new feed mixing machine in conjunction with an improved method of mixing and blending feeds which provide many new advantages.

According to the present invention there is provided an efficient and economical feed mixing machine having special utility for use by the individual farmer and which is capable of receiving free flowing feed material from a source of supply and automatically metering such material at a precise volume per minute which can be selectively adjusted as may be required or desired, and which metering process can be automatically terminated after any predetermined amount of material has been metered.

Another important object of this invention contemplates an improved method of mixing and blending feed wherein a given feed and one or more selected feed supplements or additives are simultaneously metered in predetermined quantities per given time interval according to selected percentages relative to the ultimate feed mass, and are simultaneously delivered to a conveying means in which they are continuously mixed and blended while moving to a point of deposit or discharge.

A further object inhering herein is to provide for the simultaneous measuring and mixing into a blended combination of a plurality of different free flowing materials in respective proportions according to predetermined requirements and with means being provided for automatically halting the measuring and mixing of the several materials if the supply of any one of them becomes exhausted.

Still another object is to provide that in the measuring and mixing of materials as above described, the total amount of the blended combination desired can be selectively determined and the measuring and mixing process is automatically terminated when such total amount has been obtained.

Figure 2:
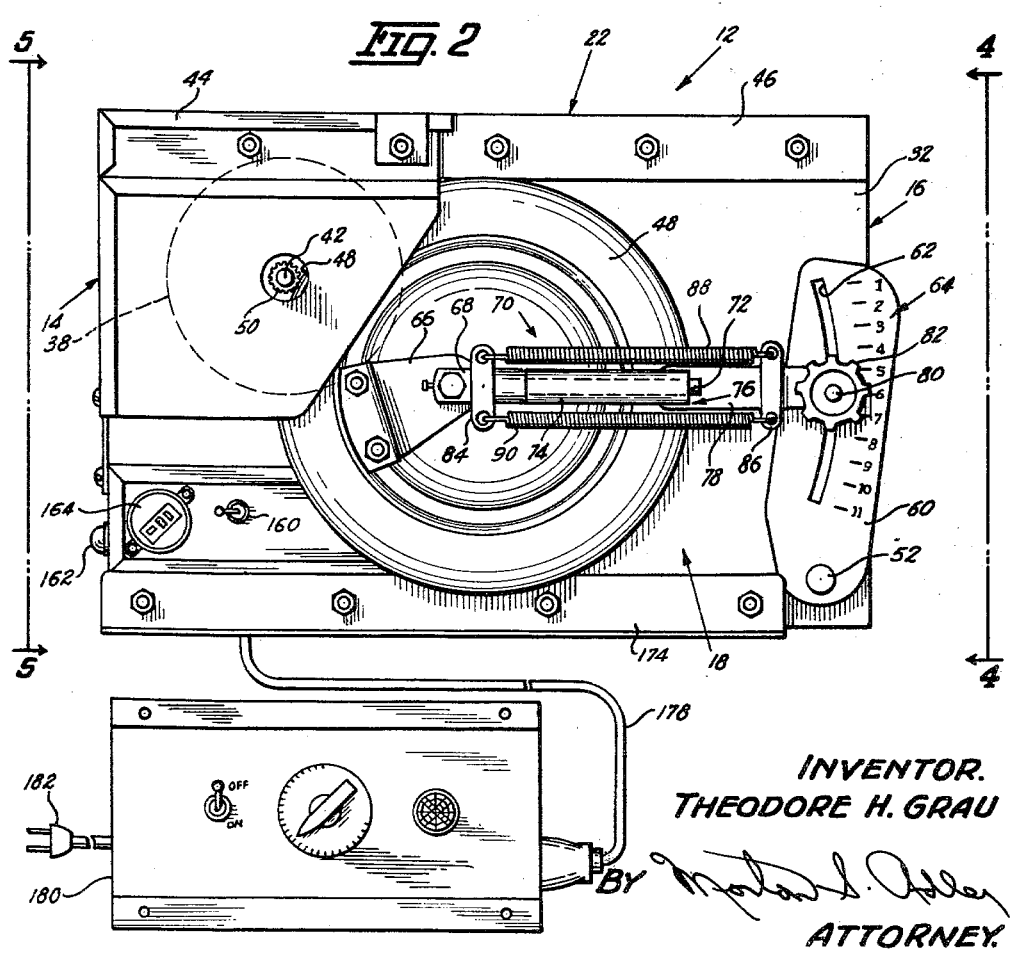
Figure 5:
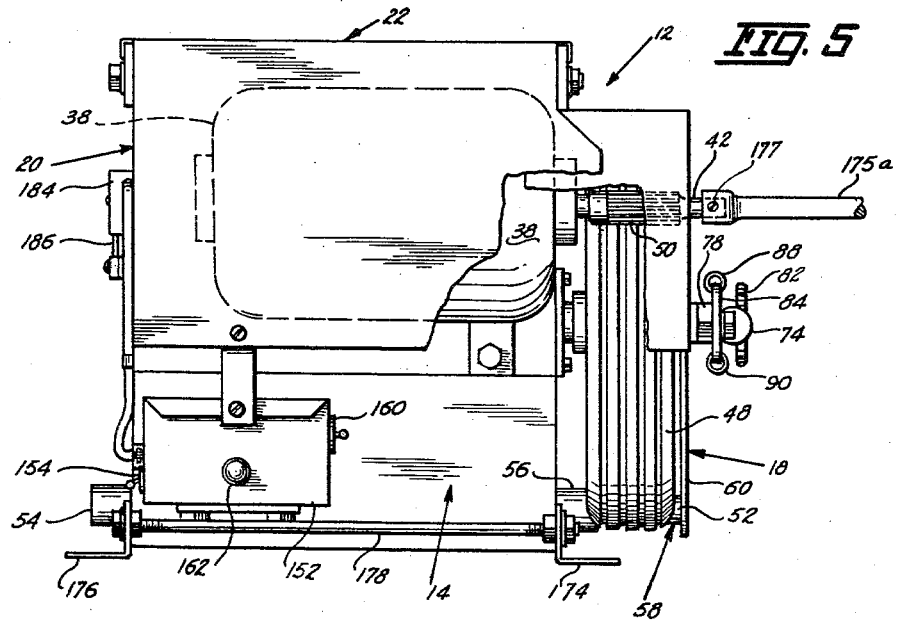
Figure 6:
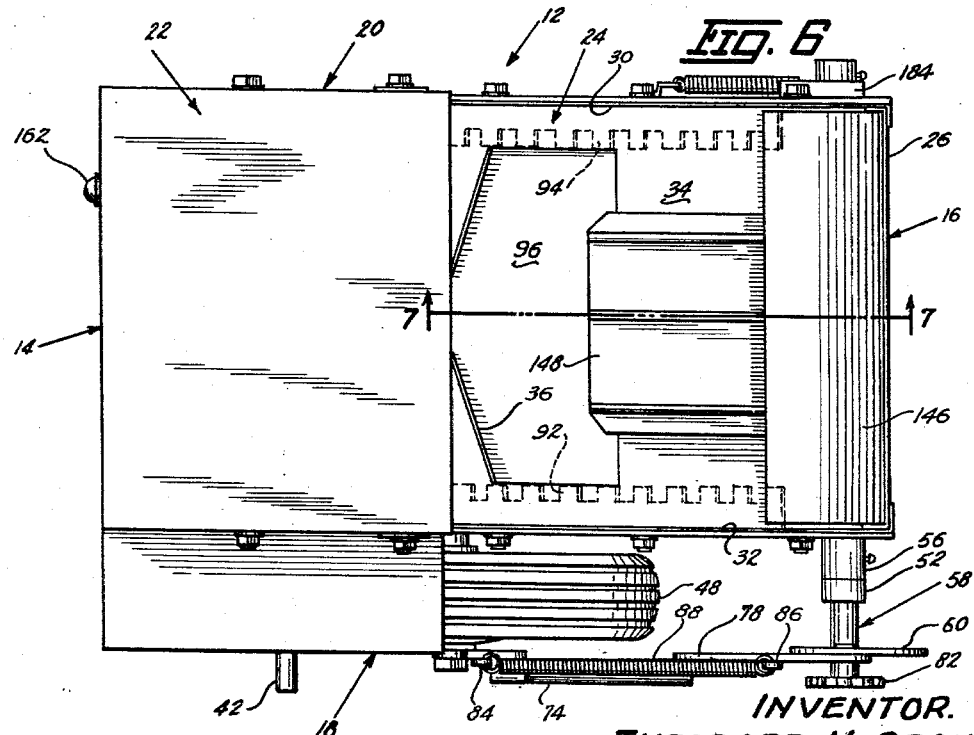

To attain these objects and such further objects as may appear herein, or be hereinafter pointed out, reference is made to the accompanying drawings forming a part hereof, in which:

FIG. 1 is a schematic view illustrating a battery of my metering devices arranged relative to a plurality of material supply bins and a conveying apparatus, FIG. 2 is a side elevational view of the metering device used with this invention showing the operating wheel and the calibrated volume control plate to which it is attached, together with the associated timer mechanism, FIG. 3 is a side elevational view of the opposite side shown in FIG. 2, FIG. 4 is an end elevational view taken from the line 4—4 of FIG. 2, FIG. 5 is an end elevational view of the opposite end shown in FIG. 4 and is taken on the line 5—5 of FIG. 2 with portions of the housing cut away to more fully illustrate the motor and its relationship to the operating wheel, FIG. 6 is a top plan view of this metering device, FIG. 7 is a cross sectional view taken on the line 7—7 of FIG. 6, FIG. 8 is a wiring diagram of the circuitry used with this metering device, FIG. 9 is an enlarged perspective exploded view of the drive mechanism for effectuating the reciprocation of the flow control gate together with the relationship to such gate of the baffle switch means for actuating and deactuating the drive mechanism, and FIG. 10 is a perspective view taken from the line 10—10 of FIG. 9 of the novel clutch means for effecting power transmission between the operating wheel and the reciprocation gate.

Referring to the drawings this new metering device or machine is designated generally by the numeral 12, and for purposes of description, references will be made to the front end 14 (FIG. 5), the rear end 16 (FIG. 4), the left side 18 (FIG. 2), the right side 20 (FIG. 3) and the top 22 (FIG. 6). The rearward portion of machine 12 defines a hopper 24 (FIGS. 6 and 7) which includes the rear wall 26, the forward wall 28, the right and left sides 30 and 32 respectively, and the bottom 34. The lower end of the rear hopper wall 26 terminates on a higher plane than the corresponding end of the forward wall 28, and the bottom 34 which extends between the lower ends of walls 26 and 28, is thus on a downward incline from rear to front of member 12. In the lower and forward portion of the bottom 34 a relatively large opening 36 is provided as a discharge aperture for metered material as will later appear.

An electric motor 38 is bolted as at 40 to the forward side of the forward hopper wall 28 so that the motor shaft 42 projects perpendicularly from the left side 18 of member 12, and a suitable hood 44 for motor 38 is attached to reinforcing bars 46 at each side of the upper edge of hopper sides 30 and 32 in any suitable manner. A tired operating wheel 48 is rotatably mounted to the outer side of the left hopper side 32 so that the perimeter of such wheel is engaged by a knurled sleeve 50 on shaft 38 for rotation thereby. Wheel 48 is designed for cooperative engagement with shaft 52 at the lower end of the rear end 16. Such shaft extends between hopper sides 30 and 32 (FIG. 4) and is supported in the bearing members 54 and 56 on the outer sides of the respective hopper sides 30 and 32. Connection of the operating wheel 48 to shaft 52 is as follows. Shaft 52 projects from bearing 56 at the left side 18 as at 58 and is secured to the lower end of an elongated upstanding control plate 60 which is provided with an elongated curved longitudinal slot 62, such slot being associated with calibrations 64 in the form of chronologically arranged numbers from top to bottom as shown in FIG. 2.

A bracket 66, mounted off center on the outer side of wheel 48 for rotation therewith, pivotally receives one end of bar 68 which is a part of the connecting assembly 70 between wheel 48 and plate 60. The other end of bar 68 terminates in an elongated axially projecting rod 72 which is telescopically journalled in the elongated tubular member 74, such member being attached at end 76 to one end of a second bar 78 axially aligned with bar 68. The other end of bar 78 is pivotally attached to a transversely arranged threaded bolt 80 (FIG. 2) which is slidably arranged in slot 62 of the control plate 60, and a manually operable knob or handle 82 on the projecting end of bolt 80 at the left side 18 is used to immovably secure bar 78 at selective points longitudinally of slot 62 relative to the calibrations 64 as may be desired and as will be referred to in more detail as this description proceeds. On each bar 68 and 78 there is secured the respective cross bars 84 and 86, and corresponding ends of such bars are connected by the respective coil springs 88 and 90 which normally yieldingly hold rod 72 and member 74 against telescopic movement.

Referring now to the rear end 16 of machine 12 (FIG. 4) and also to FIG. 9, it will be apparent that any motion transmitted to plate 60 from wheel 48 will act upon shaft 52, and I will now describe the several parts and their function which are associated with shaft 52. First it should be pointed out that as wheel 48 rotates, the connecting assembly 70 will reciprocate laterally in a well-known manner so as to rock plate 60 and correspondingly rock shaft 52 about its longitudinal axis. The specific point of attachment of bar 78 to plate 60 within the limits of slot 62 (FIG. 2) will determine the width of the arc within which plate 60 will oscillate. The smallest arc resulting in the least alternate rotary movement of shaft 52 is determined by attaching bar 78 at the uppermost portion of slot 62 in registration with calibration 1, and a progressively wider arc is obtained at registering points with the progressively higher calibration figures.

On the bottom side of the hopper bottom 34 there are parallel spaced track means 92 and 94 extending from top to bottom of bottom 34 and closely adjacent the edges of opening 36 for slidably receiving a gate 96 which is in juxtaposition with bottom 34 and is designed to completely close opening 36 at times and to uncover opening 36 in varying selective degrees at times as will later appear.

A rigid link 98 is pivotally connected at one end to the apertured ear 100 secured to the underside of gate 96 (FIG. 9) and the other end of link 98 is pivotally connected to the projecting end of a rigid arm 102. Such arm projects from one end of a collar or sleeve-like base 104 which is rotatably journalled on shaft 52 at a point approximately midway between hopper sides 30 and 32 as seen in FIG. 4. Secured to the opposite end of collar 104 for movement therewith is the clutch plate 106 that extends toward gate 96 generally parallel to arm 102 and is provided with the notch or recess 108 in its projecting edge. A coil spring 110 is mounted to shaft 52 intermediate collar 104 and hopper side 30 and so attached to arm 104 as at 112 to normally urge arm 102 downwardly and correspondingly normally maintain gate 96 in position to completely close the discharge opening 36. The limit of downward movement of arm 102 is controlled by a vertically positioned adjustment bolt assembly 114 that is integral with a support bar 116 attached to the rear hopper wall 26 in depending relationship. The bottom 118 of assembly 114 extends to a point adjacent shaft 52 (FIG. 4) where it is abutted by a rigid stop plate 120 that is secured to collar 104 and extends parallel to shaft 52 beneath bolt assembly end 118. The lengthening or shortening of assembly 114 will thus permit limited adjustments of the normally closed position of gate 96 and in addition, as one of its important functions, the exact position of notch 108 in the clutch plate 106 can be adjusted by assembly 114 which may become necessary in the clutching mechanism 122 which I shall now describe.

From the description so far it will be understood that as shaft 52 is rocked from operation of wheel 48, gate 96 remains closed since collar 104 to which arm 102 and clutch plate 106 are attached is not secured to shaft 52. To effectively transmit motion between shaft 52 and plate 106, I have used the clutch mechanism 122 which includes a solenoid mounted in housing 124 to which there is attached a suitable sleeve 126 that is mounted on and secured to shaft 52 for movement therewith as shown in FIGS. 4 and 9. Projecting from housing 124 toward gate 96 and parallel to clutch plate 106 is the spring loaded actuating arm 128 (FIG. 10) which is retractible, when actuated, in a well-known manner. Below arm 128 a support bar 130 is carried by housing 124 so as to terminate somewhat forwardly of and parallel to notch 108 in plate 106. On the side of bar 130 adjacent plate 106 there is the upstanding lever 132 secured at its bottom end to one end of pin 134 which is pivotally journalled through bar 130. Lever 132 carries a laterally projecting clutch roller 136 at its upper end which is positioned and designed to register with and engage notch 108 as will become apparent. Opposite to lever 132 on the opposite side of bar 130 a second lever 138 is secured near its bottom end to the other end of pin 134, and at its upper end is pivotally secured to the projected end of the solenoid actuating arm 128. It will thus be appreciated that levers 132 and 138 will move simultaneously with movement of arm 128. The bottom end of lever 138 is connected by spring means 140 to a suitable ear 142 on the underside of housing 124 to normally hold the upper ends of levers 132 and 138 in their forwardmost position when the solenoid is inactivated. Thus far described it will be appreciated that when the clutch means 122 is actuated, roller 136 will be retracted into engagement with notch 108 whereby plate 106 will oscillate or rock with shaft 52 and gate 96 will be correspondingly reciprocated relative to opening 36. In this operation, the adjustment of the connecting assembly 70 to plate 60 (FIG. 2) will determine the area of opening 36 to be alternately opened and closed and thus the exact amount of any given material which will fall through opening 36 during a prescribed time interval can be determined with exact accuracy.

It will be noted that the forward edge 144 of the clutch plate 106 is convex upon which roller 136 can easily move into notch 108 if exact registration is not made initially when the solenoid is actuated. Should any difficulty be experienced in this regard, or if roller 136 slips from notch 108 while operating, adjustment is made by rotating wheel 48 until assembly 70 is over the hub bolt of such wheel. In this position, roller 136 should be directly in front of notch 108 and clutch plate 106 can be adjusted by adjustment means 114 as described, to assure that such alignment is proper.

Within the hopper 24 (FIG. 7) a baffle member 146 extends downwardly and inwardly from the upper end of the rear wall 26 towards but not to bottom 34 to deflect falling material toward opening 36, and just below the bottom edge of baffle member 146 a spring loaded shelf or plate 148 projects into hopper 24 as shown, such plate 148 being pivotally attached to a rod 150 extending transversely between hopper sides 30 and 32 as shown. Plate 148 is normally urged towards its uppermost position (FIG. 7), but being in the path of flow of material falling into hopper 24, is depressed by the weight of such material during the time as such material is flowing into the hopper as will be referred to later in more detail.

Certain circuitry used with this invention (FIG. 8) is contained within a suitable receptacle 152 mounted below motor 38 (FIG. 3) and includes the toggle switches 154, 156, 158 and 160, light 162 and plug receptacle 164 which will be further identified in the description of the operation of this machine.

As shown in FIG. 1, machine 12 as described, is designed to receive a free flowing material 166 stored in a suitable bin 168. For this purpose, the top of hopper 24 is flush with the discharge opening 170 on the bin and may be either attached to the bin in depending relationship or mounted directly upon an auger-type conveying structure 172 to which material 166 is delivered by machine 12. For this latter arrangement, parallel spaced attaching bars 174 and 176 at the lower end of sides 18 and 20 (FIGS. 4 and 5) are provided and are connected at the front end 14 by the transverse rod 178 and at the rear end to hopper sides 30 and 32. It is also contemplated that several machines 12 may be used for a single mixing and blending operation and such machines are designated in FIG. 1 by the numerals 12a and 12b with the corresponding bins and material therein similarly numbered with corresponding reference letters, it being understood that materials 166, 166a and 166b will be of different types to be included in the final mixture.

When more than one of these metering machines are used in series or in a battery arrangement, only the first or master unit, 12, contains the motor 38 together with the master or motor actuating switch 158, and in all other respects, units 12a and 12b are identical therewith. In the battery arrangement, shafts 42 are connected by tubular extension shafts 175a and 175b respectively in any suitable manner such as by a pin 177. In this way, all metering machines in the series are operable from the single motor 38 on machine 12. The power lead-in line 178 to receptacle 152 for machine 12 is directly connected to a timer unit 180, and such unit is in turn directly connected to the source of A.C. power by plug 182 for operation. For additional machines 12a, 12b, or more, if desired, the lead-in line corresponding to 178 will be attached to the plug receptacle 164 of the next adjacent machine toward the master unit 12.

A microswitch 184 on the outer side of hopper side 30 (FIG. 3) has the spring loaded trip lever 186 operatively connected to plate 148. Such switch is open when plate 148 is in its uppermost position and closed when plate 148 is depressed by material falling upon it. Thus when the supply of material to hopper 24 ceases, plate 148 goes to its uppermost position to open switch 184 to effect the mixing process as will become apparent.

With machine 12 constructed as described, it will operate in the following manner. The proper setting on plate 60 (FIG. 2) is made according to the particular material to be metered and according to the desired amount of such material during a given interval of time. Timer 180 will of course regulate the operating time of the machine 12 and each of the calibrations 64 have an exact relationship to the number of pounds per minute of a given material which will pass through opening 36 at such setting. While such amounts can be easily determined by a test run, I have already determined such data for many feed materials and additives such as dry shelled corn, whole oats, protein pellets, dry cracked corn and the like and have prepared a chart (not shown) for ready reference and which is supplied to users of this machine.

To place machine 12 in full operation after plate 60 is adjusted, all four toggle switches 154, 156, 158 and 160 are placed in their up or on position. Switch 158 supplies power to motor 38 and is in effect a master switch that must be on for any operation of unit 12. Switch 160 merely completes the circuit when only one machine is used and when more than one machine is used, only switch 160 on the last machine in the series is at on position.

With switch 158 on at all times for operation, and with switches 154 and 156 also at on position, motor 38 will operate and clutch plate 106 will be engaged by the clutch roller 136 to reciprocate gate 96 only so long as material is flowing into hopper 24 to keep plate 148 depressed and the microswitch 184 closed. Thus, as soon as the supply of material to hopper 24 ceases, plate 148 opens the switch 184 and motor 38 stops operating. The importance of this feature is more apparent when machines 12, 12a and 12b, for example, are connected in series as indicated. In such a situation, with predetermined quantities of material to be metered and blended from the different bins in selected proportions, the exhaustion of material supply from any bin will result in the opening of the microswitch 184 on the affected machine and automatically shut down the entire operation and thus avoid any improper mixture of proportions. However, with a battery of metering machines as here disclosed, it is frequently desirable to meter material from one or more of the units but not from all of them and this is accomplished by manipulation of the toggle switches 154 and 156 which will be the same on all machines in the series.

With switch 158 on machine 12 at on to operate motor 38 and the several shafts 42, switches 154 and 156 for any machine not being used to meter material must be in their down or off position. Switch 154, associated with the clutching assembly 122, thus prevents engagement of the clutch roller 136 with the clutch plate 106 so gate 96 will not operate on such machine. Switch 156, associated with the microswitch 184, operates to eliminate the automatic cut-off function of switch 184 which would otherwise stop all operations if no material were in the hopper of a machine not being used. However, if a hopper in a machine not being used was full of material so that plate 148 was down and switch 184 closed, then switch 156 can be left on and such machine would still be unable to meter as long as the clutching switch 154 was off.

On any machine where the clutching mechanism 122 is engaged for metering operation, light 162 will be illuminated to serve as a visual indicator, observable from a distance, that such machine is operating.

If for any reason the gate 96 should become jammed because of foreign matter or other obstruction entering the hopper 24 while the clutch assembly 122 is energized, any adverse effect on motor 38 due to the stopping of plate 60 is avoided by the connecting assembly 70. In such a situation, wheel 48 will continue to operate in its normal manner with rod 72 reciprocating telescopically relative to the tubular member 74 against the tension of springs 88 and 90.

By use of the auger type conveyor 172 operating below the several machines 12, 12a and 12b and receiving the metered material therefrom, the material from all machines is thoroughly mixed as it moves in a steady and continuous flow toward the point of discharge or deposit. This method of mixing is especially efficient in relation to the metering machines described since each machine is metering and delivering to the auger respective materials in exact proportions and it is thus in such proportions that it is blended as it is conveyed. Such a method is considerably different from dumping the full proportionate amount of the respective materials in one spot or into one container and then churning and mixing it together since in such a process, uniform proportionate mixture is not likely to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A dispensing device for free flowing materials comprising in combination:
   a hopper having an inclined bottom provided with a discharge opening,
   a gate reciprocally mounted on the underside of said bottom to serve as a closure for said opening,
   a shaft adjacent said gate and rotatably journalled to said hopper,
   an electric motor connected to said shaft for oscillating the same about its longitudinal axis,
   a switch on said hopper connected to said motor, a spring-loaded switch actuating plate connected to said switch and pivotally disposed within said hopper so as to normally project into said hopper above said bottom and into the path of material entering said hopper, said plate being depressed under the weight of material entering said hopper to hold said switch closed to operate said motor and returning to normal position when not subjected to the weight of material to open said switch and stop said motor, linkage means connecting said shaft to said gate to effect reciprocation thereof relative to said opening, and control means intermediate said motor means and said shaft for selectively regulating the degree of oscillation of said shaft and thereby selectively regulating the degree of reciprocation of said gate and the amount of said opening exposed during each cycle of gate reciprocation.

2. A dispensing device for free flowing materials comprising in combination:

a hopper having an inclined bottom provided with a discharge opening, a gate reciprocally mounted on said bottom to serve as a closure for said opening, a shaft rotatably journalled to said hopper, motor means connected to said shaft for oscillating the same about its longitudinal axis, a solenoid actuated clutch roller mounted to said shaft for oscillation therewith, a notched clutch plate oscillatably mounted on said shaft but free of attachment thereto, means to actuate and deactuate said clutch roller, the actuation of said clutch roller effecting engagement thereof with the notch in said clutch plate to cause oscillation of said clutch plate, and linkage means connecting said clutch plate to said gate whereby said gate is reciprocated relative to said opening when said clutch roller is actuated.

3. A device as defined in claim 2 including control means intermediate said motor and said shaft for selectively regulating the degree of oscillation of said shaft and thereby selectively regulating the degree of reciprocation of said gate and the amount of said opening exposed during each cycle of gate reciprocation.

4. A dispensing device for free flowing materials comprising in combination:

a hopper having an inclined bottom provided with a discharge opening, a gate reciprocally mounted on the underside of said bottom to serve as a closure for said opening, a shaft adjacent said gate and rotatably journalled to said hopper, a motor carried by said hopper and having a drive shaft, an operating wheel on said hopper having its perimeter abutted by said drive shaft, a reciprocating drive connecting assembly eccentrically connected at one end to said operating wheel and operatively connected at the other end to said shaft to effect oscillation of said shaft when said motor is operating, a clutch member mounted to said shaft for oscillation therewith, a clutch plate oscillatably mounted on said shaft but free of attachment thereto, means to actuate and deactuate said clutch member, the actuation of said clutch member effecting engagement thereof with said clutch plate to cause oscillation of said clutch plate, and linkage means connecting said clutch plate to said gate whereby said gate is reciprocated relative to said opening when said clutch member is actuated.

5. A device as defined in claim 4 wherein:

said reciprocating drive connecting assembly includes telescopically related connected members, spring means normally holding said related connecting members in retracted position during oscillation of said shaft, and upon any jamming of said gate during reciprocation sufficient to cause the stopping of oscillation of said shaft, said related connecting members will telescopically reciprocate to permit continued operation of said motor and operating wheel for preventing damage thereto.

6. A dispensing device for free flowing material comprising in combination:

a hopper having an inclined bottom provided with a discharge opening, a gate reciprocally mounted on said bottom to serve as a closure for said opening, a shaft rotatably journalled to said hopper, a motor carried by said hopper and having a drive shaft, an operating wheel on said hopper having its perimeter abutted by said drive shaft, a reciprocating drive connecting assembly, spring loaded for a normal retracted position, eccentrically connected at one end to said operating wheel and operatively connected at the other end to said shaft to effect oscillation of said shaft when said motor is operating, a solenoid actuated clutch roller mounted to said shaft for oscillation therewith, a notched clutch plate oscillatably mounted on said shaft but free of attachment thereto, means to actuate and deactuate said clutch roller, the actuation of said clutch roller effecting engagement thereof with the notch in said clutch plate to cause oscillation of said clutch plate, and linkage means connecting said clutch plate to said gate whereby said gate is reciprocated relative to said opening when said clutch roller is actuated.

7. A dispensing device for free flowing materials comprising in combination:

a hopper having an inclined bottom provided with a discharge opening, a gate reciprocally mounted on the underside of said bottom to serve as a closure for said opening, a shaft adjacent said gate and rotatably journalled to said hopper, an upstanding control plate secured at its lower end to one end of said shaft, said control plate provided with an elongated longitudinal calibrated slot, a motor carried by said hopper and having a drive shaft, an operating wheel on said hopper having its perimeter abutted by said drive shaft, a drive connecting assembly eccentrically connected at one end to said operating wheel and adjustably securable at the other end to said control plate at selective positions within said slot, a clutch member mounted to said shaft for oscillation therewith, a clutch plate oscillatably mounted on said shaft but free of attachment thereto, means to actuate and deactuate said clutch member, the actuation of said clutch member effecting engagement thereof with said clutch plate to cause oscillation of said clutch plate, and linkage means connecting said clutch plate to said gate whereby said gate is reciprocated relative to said opening when said clutch member is actuated.

8. A device as defined in claim 7 wherein said drive connecting assembly is adapted for reciprocation but is spring loaded for normal retention in retracted position.

9. In apparatus for mixing and blending a plurality of free flowing materials from a plurality of sources of supply, the combination of:
  an auger type conveyor,
  a battery of metering machines each connected respectively to a respective source of material supply and each adapted respectively to discharge said material into said conveyor, each of said machines including:
  a hopper having an inclined bottom provided with a discharge opening,
  a gate reciprocally mounted on the underside of said bottom to serve as a closure for said opening,
  a shaft adjacent said gate and rotatably journalled to said hopper,
  drive means connected to said shaft for oscillating the same about its longitudinal axis,
  linkage means connecting said shaft to said gate to effect reciprocation thereof relative to said opening,
  control means intermediate said drive means and said shaft for selectively regulating the degree of oscillation of said shaft and thereby selectively regulating the degree of reciprocation of said gate and the amount of said opening exposed during each cycle of gate reciprocation,
  a motor connected to the drive means on only one of said machines, and
  means interconnecting the respective drive means on said machines.

10. The combination as defined in claim 9 wherein:
  said motor is an electric motor,
  circuitry interconnecting said machines, and each machine including:
  a switch on said hopper,
  a spring-loaded switch actuating plate connected to said switch and pivotally disposed within said hopper so as to normally project into said hopper above said bottom and into the path of material entering said hopper,
  said plate being depressed under the weight of material entering said hopper to hold said switch closed and returning to normal position when not subjected to the weight of material to open said switch,
  and said switches connected in series with said motor so that the opening of any one switch will stop said motor and correspondingly stop all machines.

11. The combination as defined in claim 10 including second manually operable switch means for each hopper in said circuitry to maintain the circuitry of said first mentioned switch in closed position and thus render ineffective the operation of said switch actuating plate.

12. In apparatus for mixing and blending a plurality of free flowing materials from a plurality of sources of supply, the combination of:
  an auger type conveyor,
  a battery of metering machines each connected respectively to a respective source of material supply and each adapted respectively to discharge said material into said conveyor, each of said machines including:
  a hopper having an inclined bottom provided with a discharge opening,
  a gate reciprocally mounted on said bottom to serve as a closure for said opening,
  a shaft rotatably journalled to said hopper,
  drive means connected to said shaft for oscillating the same about its longitudinal axis,
  a solenoid actuated clutch roller mounted to said shaft for oscillation therewith,
  a notched clutch plate oscillatably mounted on said shaft but free of attachment thereto,
  means to actuate and deactuate said clutch roller,
  the actuation of said clutch roller effecting engagement thereof with the notch in said clutch plate to cause oscillation of said clutch plate,
  linkage means connecting said clutch plate to said gate whereby said gate is reciprocated relative to said opening when said clutch roller is actuated,
  an electric motor connected to the drive means on only one of said machines,
  means interconnecting the respective drive means on said machines, and
  circuitry interconnecting said machines whereby with said motor operating the reciprocation of any selected gate or gates may be effected.

13. The combination as defined in claim 12 wherein said drive means includes for each machine:
  an upstanding control plate secured at its lower end to one end of said shaft,
  said control plate provided with an elongated longitudinal calibrated slot,
  a drive shaft on each hopper,
  an operating wheel on said hopper having its perimeter abutted by said drive shaft, and
  a reciprocating drive connecting assembly, spring loaded for a normal retracted position, eccentrically connected at one end to said operating wheel and adjustably securable at the other end to said control plate at selective positions within said slot to effect the degree of reciprocation of said gate.

14. A dispensing device for free flowing materials comprising in combination:
  a hopper having an inclined bottom provided with a discharge opening,
  a gate reciprocally mounted on said bottom to serve as a closure for said opening,
  a shaft rotatably journalled to said hopper,
  motor means connected to said shaft for oscillating the same about its longitudinal axis,
  linkage means connecting said shaft to said gate to effect reciprocation thereof relative to said opening, and
  control means intermediate said motor means and said shaft for selectively regulating the degree of oscillation of said shaft and thereby selectively regulating the degree of reciprocation of said gate and the amount of said opening exposed during each cycle of gate reciprocation.

15. A dispensing device for free flowing materials comprising in combination:
  a hopper having an inclined bottom provided with a discharge opening,
  a gate reciprocally mounted on said bottom to serve as a closure for said opening,
  a shaft rotatably journalled to said hopper,
  motor means connected to said shaft for oscillating the same about its longitudinal axis,
  a clutch member mounted to said shaft for oscillation therewith,
  a clutch plate oscillatably mounted on said shaft but free of attachment thereto,
  means to actuate and deactuate said clutch member,
  the actuation of said clutch member effecting engagement thereof with said clutch plate to cause oscillation of said clutch plate, and
  linkage means connecting said clutch plate to said gate whereby said gate is reciprocated relative to said opening when said clutch member is actuated.

16. A device as defined in claim 15 including control means intermediate said motor and said shaft for selectively regulating the degree of oscillation of said shaft and thereby selectively regulating the degree of reciprocation of said gate and the amount of said opening exposed during each cycle of gate reciprocation.

(References on following page)

References Cited by the Examiner

UNITED STATES PATENTS

| | | | |
|---|---|---|---|
| 657,998 | 9/00 | Williams | 222—136 X |
| 1,622,262 | 3/27 | Kindrat et al. | 221—214 X |
| 2,549,908 | 4/51 | Johansen | 222—56 X |
| 2,656,121 | 10/53 | Tanner | 222—58 X |
| 2,863,651 | 12/58 | McBride | 222—57 X |
| 2,947,544 | 8/60 | Hurt | 222—135 X |
| 3,089,618 | 5/63 | Forsyth | 222—66 X |

RAPHAEL M. LUPO, *Primary Examiner.*

HADD S. LANE, *Examiner.*